(12) United States Patent
Dodds et al.

(10) Patent No.: US 12,017,268 B2
(45) Date of Patent: Jun. 25, 2024

(54) SPHERICAL FUSED SILICA COMPOSITIONS FOR INJECTION MOLDED CERAMIC CORES AND METHODS OF MAKING PARTS USING SUCH COMPOSITIONS

(71) Applicant: Chromalloy Gas Turbine LLC, Palm Beach Gardens, FL (US)

(72) Inventors: Gerald C. Dodds, Lutz, FL (US); Mark S. Haber, Brandon, FL (US); Zachary E. Baierl, University Heights, OH (US)

(73) Assignee: Chromalloy Gas Turbine LLC, Palm Beach Gardens, FL (US)

( * ) Notice: Subject to any disclaimer, the term of this patent is extended or adjusted under 35 U.S.C. 154(b) by 0 days.

(21) Appl. No.: 17/660,038

(22) Filed: Apr. 21, 2022

(65) Prior Publication Data

US 2023/0339013 A1    Oct. 26, 2023

(51) Int. Cl.
```
B22C 1/00       (2006.01)
B22C 7/02       (2006.01)
B22C 9/10       (2006.01)
C04B 35/14      (2006.01)
C04B 35/634     (2006.01)
C04B 35/64      (2006.01)
```

(52) U.S. Cl.
CPC .............. *B22C 1/00* (2013.01); *B22C 7/02* (2013.01); *B22C 9/10* (2013.01); *C04B 35/14* (2013.01); *C04B 35/634* (2013.01); *C04B 35/64* (2013.01); *C04B 2235/3248* (2013.01); *C04B 2235/3418* (2013.01); *C04B 2235/5212* (2013.01); *C04B 2235/528* (2013.01); *C04B 2235/5436* (2013.01); *C04B 2235/6022* (2013.01); *C04B 2235/9676* (2013.01)

(58) Field of Classification Search
None
See application file for complete search history.

(56) References Cited

FOREIGN PATENT DOCUMENTS

| EP | 0179649 A2 | 4/1986 |
| EP | 0179649 A3 | 4/1986 |
| EP | 4265351 A1 | 10/2023 |

OTHER PUBLICATIONS

CN-105732014-A ; Jul. 6, 2016.*
CN-102179477-A; Sep. 14, 2011.*
CN-105174772-A; Dec. 23, 2015.*
Extended Search Report, dated Aug. 14, 2023, 10 pages, received in European Patent Application No. 23168467.1.

* cited by examiner

Primary Examiner — Guinever S Gregorio
(74) Attorney, Agent, or Firm — AVEK IP, LLC (57) ABSTRACT

A single crystal ceramic core composition has an inorganic portion and an organic portion. The inorganic portion makes up about 85% by weight of the total weight of the ceramic core composition, and the organic portion makes up about 15% by weight of the total weight of the ceramic core composition. The inorganic portion includes about 94 to 98% by weight spherical fused silica, and about 2 to 6% by weight zircon flour. The organic portion includes about 84 to 88% by weight binder, about 1 to 2% by weight dye, about 6 to 12% by weight surfactant, and about 1 to 5% by weight polymeric fiber.

17 Claims, 4 Drawing Sheets

SPHERICAL FUSED SILICA COMPOSITIONS FOR INJECTION MOLDED CERAMIC CORES AND METHODS OF MAKING PARTS USING SUCH COMPOSITIONS

FIELD OF THE DISCLOSURE

The disclosure relates generally to compositions for injection molded ceramic cores. More specifically, the disclosure relates to spherical fused silica compositions for forming injection molded ceramic cores for turbine blades, vanes, and hot stage turbine components.

BACKGROUND

According to a typical casting process, a ceramic core mixture is provided as a composite of organic binder and ceramic particulates which is injected into a die having a particularly designed profile. In the case of turbine blades, the die is shaped in the desired internal profile of the turbine blade. Once the material is set and the core is formed, the core is removed from the die and undergoes a firing process to remove the organics and sinter the core. The core is subsequently inserted into a wax die, which is shaped to the desired external profile of the turbine blade. A gap is formed between the core and the wax die, and wax is injected into the gap and allowed to cool in the shape of the external profile. The wax is then allowed to cool, and the die is opened, and the binder core composite is ejected.

The wax-coated ceramic core is then coated (e.g., dipped) in a ceramic shell slurry to form a hardened outer shell around the core. The wax is then removed (e.g., by melting), leaving a void between the hardened outer shell and the ceramic core. The void is then filled with a liquid metal having the desired composition for the final part. The liquid metal is cooled according to a predetermined method for forming the cast part. For example, the cast part may be equiaxed (EQ), directionally solidified (DS), or single crystal, as is known to those of skill in the art.

Once the liquid metal is cooled, the outer shell is knocked off the cast metal part, and the core is chemically leached from within, leaving only the metal part. The metal part is then machined and coated for use.

Various ceramic core compositions have been developed for use in the casting process. However, the compositions have inherent disadvantages. Ceramic core compositions having superior properties for the casting process as compared to prior compositions would be beneficial.

SUMMARY

The following presents a simplified summary of the invention in order to provide a basic understanding of some aspects of the invention. The summary is not an extensive overview of the invention. It is not intended to identify the critical elements of the invention or to delineate the scope of the invention. Its sole purpose is to present some concepts of the invention in a simplified form as a prelude to the more detailed description that is presented elsewhere herein.

In one embodiment, a single crystal ceramic core composition has an inorganic portion and an organic portion. The inorganic portion makes up about 85% by weight of the total weight of the ceramic core composition, and the organic portion makes up about 15% by weight of the total weight of the ceramic core composition. The inorganic portion includes about 94 to 98% by weight spherical fused silica, and about 2 to 6% by weight zircon flour. The organic portion includes about 84 to 88% by weight binder, about 1 to 2% by weight dye, about 6 to 12% by weight surfactant, and about 1 to 5% by weight polymeric fiber.

According to some aspects of the invention, the inorganic portion of the ceramic core composition comprises about 95 to 97% by weight spherical fused silica and about 3 to 5% by weight zircon flour; and the organic portion of the ceramic core composition comprises about 86 to 87% by weight binder, about 1.2 to 1.6% by weight dye, about 8 to 10% by weight surfactant, and about 2 to 4% by weight polymeric fiber.

In other aspects of the invention, the spherical fused silica comprises a plurality of particles having the following particle size distribution:

| % of particles | size of particle (in microns) |
| --- | --- |
| about 0-3 | <1.16 |
| about 0-1.5 | 1.16-1.64 |
| about 0-1.8 | 1.64-2.31 |
| about 1.4-2.4 | 2.31-3.27 |
| about 1.6-2.6 | 3.27-4.62 |
| about 2.0-3.0 | 4.62-6.54 |
| about 2.9-3.9 | 6.54-9.25 |
| about 4.4-5.4 | 9.25-13.08 |
| about 6.6-7.6 | 13.08-18.50 |
| about 9.2-10.2 | 18.50-26.16 |
| about 12.7-13.7 | 26.16-37.0 |
| about 16.9-17.9 | 37.0-52.33 |
| about 16.7-17.7 | 52.33-74.0 |
| about 9.6-10.6 | 74.0-104.7 |
| about 3.9-4.9 | 104.7-148.0 |
| about 1.4-2.4 | 148.0-209.3 |
| about 1.4-2.4 | 209.3-296.0 |
| about 0-2 | >296-0. |

According to further aspects of the invention, the binder is a thermoplastic material. In some aspects, the thermoplastic material is a modified paraffin-based wax.

In still further aspects of the invention, the surfactant comprises an effective amount of sodium stearate, an effective amount of aluminum stearate, and an effective amount of oleic acid. The polymeric fiber comprises rayon fiber according to yet another aspect of the invention.

According to some aspects, the spherical fused silica comprises a plurality of particles, the plurality of particles having the following particle size distribution:

| % of particles | size of particle (in microns) |
| --- | --- |
| about 0-2.7 | <1.16 |
| about 0.9-1.1 | 1.16-1.64 |
| about 1.2-1.4 | 1.64-2.31 |
| about 1.8-2.0 | 2.31-3.27 |
| about 2.0-2.2 | 3.27-4.62 |
| about 2.4-2.6 | 4.62-6.54 |
| about 3.3-3.5 | 6.54-9.25 |
| about 4.8-5.0 | 9.25-13.08 |
| about 7.0-7.2 | 13.08-18.50 |
| about 9.6-9.8 | 18.50-26.16 |
| about 13.1-13.3 | 26.16-37.0 |
| about 17.3-17.5 | 37.0-52.33 |
| about 17.1-17.3 | 52.33-74.0 |
| about 10.0-10.2 | 74.0-104.7 |
| about 4.3-4.5 | 104.7-148.0 |
| about 1.8-2.0 | 148.0-209.3 |
| about 1.8-2.0 | 209.3-296.0 |
| about 0-1.3 | >296-0. |

In yet further aspects of the invention, the spherical fused silica comprises a plurality of particles having the following particle size distribution:

| % of particles | size of particle (in microns) |
|---|---|
| about 0 | <1.16 |
| about 1 | 1.16-1.64 |
| about 1 | 1.64-2.31 |
| about 2 | 2.31-3.27 |
| about 2 | 3.27-4.62 |
| about 3 | 4.62-6.54 |
| about 3 | 6.54-9.25 |
| about 5 | 9.25-13.08 |
| about 7 | 13.08-18.50 |
| about 10 | 18.50-26.16 |
| about 13 | 26.16-37.0 |
| about 17 | 37.0-52.33 |
| about 17 | 52.33-74.0 |
| about 10 | 74.0-104.7 |
| about 4 | 104.7-148.0 |
| about 2 | 148.0-209.3 |
| about 2 | 209.3-296.0 |
| about 0 | >296-0. |

In another embodiment of the invention, a single crystal ceramic core composition includes an inorganic portion comprising about 85% by weight of the total weight of the ceramic core composition, and an organic portion comprising about 15% by weight of the total weight of the ceramic core composition. The inorganic portion includes about 94 to 98% by weight spherical fused silica and about 2 to 6% by weight zircon flour. The organic portion includes about 84 to 88% by weight binder and about 12 to 16% by weight surfactant and dye.

According to some aspects of the invention, the surfactant comprises about 6 to 12% by weight of the organic portion, with the remainder of the organic portion being dye.

In certain aspects, the binder is a paraffin-based wax.

In further aspects of the invention, the spherical fused silica comprises about 96% by weight of the inorganic portion, and the balance of the weight of the inorganic portion is zircon. In still further aspects of the invention, the binder comprises about 86.5% by weight of the organic portion, and the balance of the weight of the organic portion is surfactant and dye.

According to one or more aspects of the invention, the surfactant comprises an effective amount of sodium stearate, an effective amount of aluminum stearate, and a fatty acid.

In still yet further aspects, the spherical fused silica comprises a plurality of particles having the following particle size distribution:

| % of particles | size of particle (in microns) |
|---|---|
| about 0-3 | <1.16 |
| about 0-1.5 | 1.16-1.64 |
| about 0-1.8 | 1.64-2.31 |
| about 1.4-2.4 | 2.31-3.27 |
| about 1.6-2.6 | 3.27-4.62 |
| about 2.0-3.0 | 4.62-6.54 |
| about 2.9-3.9 | 6.54-9.25 |
| about 4.4-5.4 | 9.25-13.08 |
| about 6.6-7.6 | 13.08-18.50 |
| about 9.2-10.2 | 18.50-26.16 |
| about 12.7-13.7 | 26.16-37.0 |
| about 16.9-17.9 | 37.0-52.33 |
| about 16.7-17.7 | 52.33-74.0 |
| about 9.6-10.6 | 74.0-104.7 |
| about 3.9-4.9 | 104.7-148.0 |
| about 1.4-2.4 | 148.0-209.3 |
| about 1.4-2.4 | 209.3-296.0 |
| about 0-2 | >296-0. |

According to still another embodiment of the invention, a method of forming a turbine blade includes: (a) injecting a single crystal ceramic core composition into a mold to form a core having an internal profile of a turbine blade; (b) removing the core from the mold; (c) subjecting the core to a firing process; (d) inserting the fired cored into a die; (e) injecting liquid wax into an area formed between the fired core and the die, wherein the area formed between the fired core and the die has a profile, the profile being an external profile of the turbine blade; (f) removing the wax-covered fired core from the die; (g) forming a hardened ceramic shell around the wax-covered fired core; (h) removing the wax from between the hardened shell and the fired core thereby forming a void between the hardened shell and the fired core; (i) casting molten metal into the void and allowing the molten metal to cool to form the turbine blade, the fired core being positioned within the turbine blade; (j) removing the shell from the turbine blade; and (k) leaching the fired core from within the turbine blade. The single crystal ceramic core composition includes an inorganic portion comprising about 94-98% by weight spherical fused silica, wherein the inorganic portion comprises about 85% by weight of the total weight of the single crystal ceramic core composition; and an organic portion comprising about 85-89% by weight binder, wherein the organic portion comprises about 15% by weight of the total weight of the single crystal ceramic core composition.

In some aspects of the invention, the inorganic portion of the single crystal ceramic core comprises about 96% by weight silica; and the organic portion of the single crystal ceramic core comprises about 87% binder. According to still further aspects, the inorganic portion of the single crystal ceramic core composition comprises about 4% by weight zircon, and wherein the organic portion of the single crystal ceramic core composition comprises about 13% by weight surfactant, dye, and polymer fiber.

WRITTEN DESCRIPTION

Embodiments of ceramic core compositions are described herein. As will be described in greater detail below, the ceramic core may be used to cast directionally-solidified (DS) and/or single crystal (SX) parts. In some embodiments, the ceramic core having the compositions described herein may additionally be used to cast equiax castings. The ceramic core compositions described herein allow castings to be thinner than previous core compositions allowed, and increase the reproduction consistency as compared to previous core compositions. Thus, the ceramic core compositions provide means for producing parts reliably and consistently.

Figure 1:
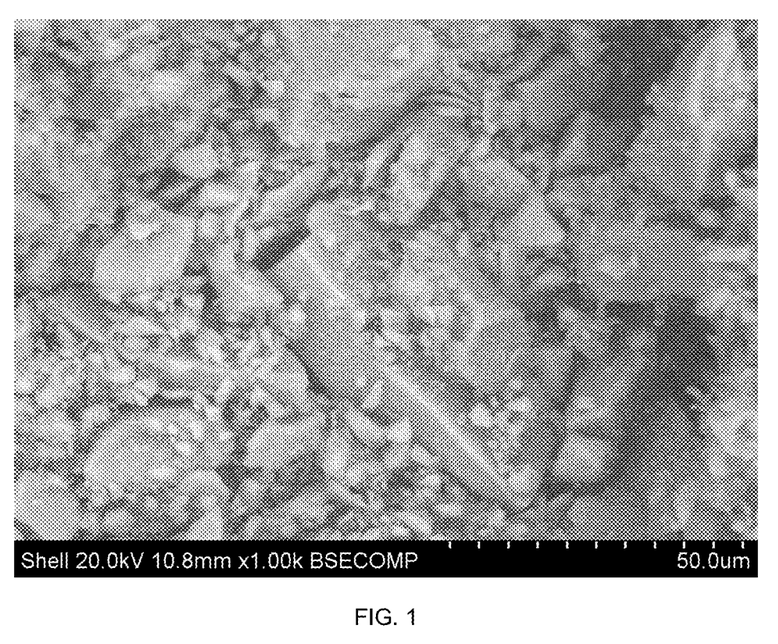
FIG. 1 is a scanning electron micrograph of a silica powder showing a distribution of acicular glass fragments.

According to some embodiments of the invention, a single crystal (SX) ceramic core composition comprises a mix of conventional fused silica and mineralizers, including but not limited to aluminum and sodium compounds, such as aluminum stearate and sodium stearate. A binder, comprising a wax, dyes, surfactants, and other organic compounds may additionally be added to the mix to control various aspects of the mixture. The fused silica comprises a distribution of acicular fragments based on standard grades of high purity fused silica having a high aspect ratio, as shown in the scanning electron micrograph of FIG. 1. When combined with the silica, the elemental alkali mineralizers help to eliminate instabilities exhibited by previous ceramic core compositions.

In embodiments, the fused silica comprises about 80-90 wt % of the total weight of the core mix. Effective amounts of organic components, including a binder material, dyes, and surfactants, are provided. In total, the organic components comprise about 10-20% of the total weight of the core mix.

Figure 2:
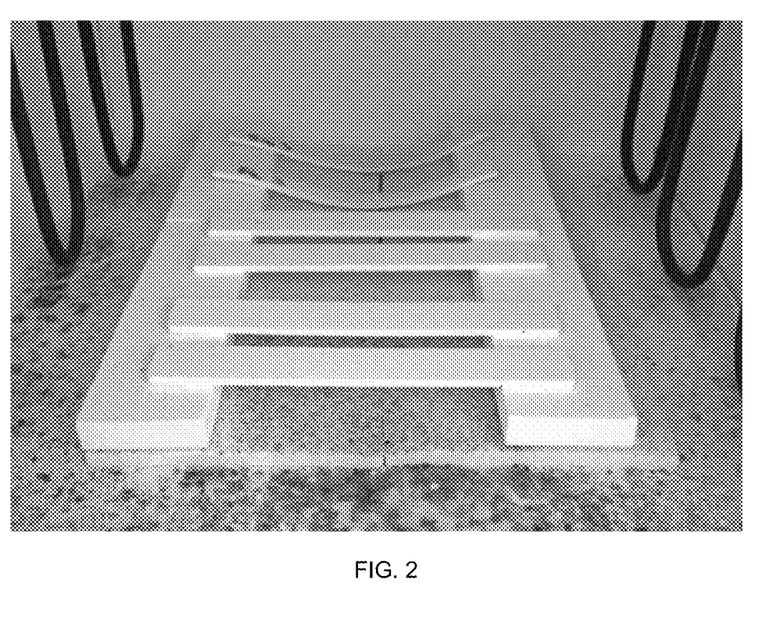
FIG. 2 is a photograph of ceramic core components showing the stability of various silica core compositions.

FIG. 2 illustrates the stability of a prior art ceramic core composition as compared to a SX ceramic core composition as described herein. As shown in FIG. 2, core bodies made with prior art core mixes (i.e., the two core bodies at the back of the figure) exhibit significant instability at 2850° F. with the core bodies showing clear deformation. The core bodies made with the SX core mix (i.e., the four core bodies at the front of the figure) exhibit superior stability at high temperatures, with a slump of less than 0.020" at 2850° F.

Figure 3:
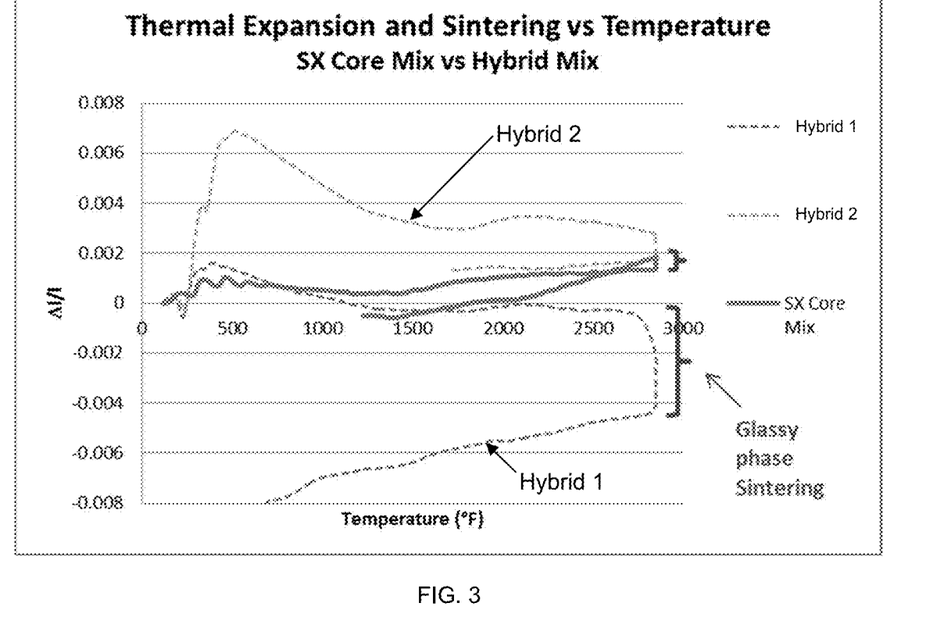
FIG. 3 is a plot showing thermal expansion and sintering versus temperature for various silica core compositions.
Figure 4:
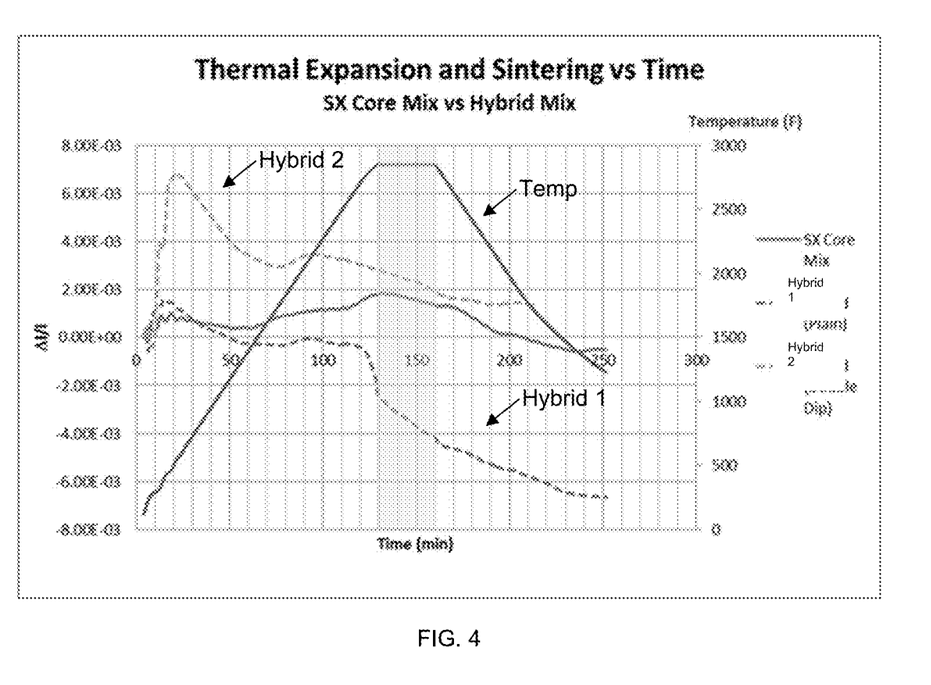
FIG. 4 is a plot showing thermal expansion and sintering versus time for various silica core compositions.

FIGS. 3 and 4 further illustrate the improved performance of the SX core mix. FIG. 3 shows expansion-temperature curves during dilatometer thermal analysis of a prior art hybrid core mix and the SX core mix. In FIG. 3, the bottom dashed line represents the expansion-temperature curve of a typical prior art hybrid core mix. At about 2850° F., or the casting temperature of the ceramic mix, the hybrid core mix exhibits severe shrinkage of the material, indicating a high degree of instability. In comparison, the SX core mix, illustrated by the solid line in FIG. 3, exhibits little shrinkage. In general, the smaller the degree of shrinkage, the more stable the material is at high temperatures. Accordingly, FIG. 3 shows that the SX core mix exhibits much greater stability as compared to the hybrid core mix.

FIG. 4 illustrates expansion-temperature curves as a function of time for the prior art hybrid core mix and the SX core mix. Here again, it can be seen that the SX core mix exhibits superior stability over time and at variable temperatures as compared to the hybrid core mix.

While the SX core mix clearly improves on the stability of traditional core mixes, it was found that the SX core mix exhibited poor flow properties and was not capable of injecting for small, detailed parts. Accordingly, a core mix demonstrating further improved flow and injection properties as compared to the SX core mix was desired, yet having the same improved stability of the SX core mix. Surprisingly, it was found that utilizing spherical fused silica rather than conventional fused silica powder increases the flow properties of the ceramic material while maintaining the stability of the mixture at high temperatures.

According to embodiments of the invention, another SX ceramic core composition comprises an effective amount of an inorganic mixture comprising spherical fused silica and an effective amount of a binder comprising various mineralizers, as will be further described herein. In embodiments, the inorganic mixture comprises about 80-90% by weight of the total weight of the ceramic core composition. In some embodiments, the inorganic mixture comprises about 83-87% by weight of the total weight of the ceramic core composition. In still further embodiments, the inorganic mixture comprises about 84-86% by weight, or about 85% by weight of the total weight of the ceramic core composition.

The silica comprises about 90-99% by weight of the inorganic portion of the ceramic core composition (or about 76-84% by weight of the total weight of the SX ceramic core composition). In embodiments, the silica forms about 94-98% by weight of the inorganic portion of the ceramic core composition (or about 80-83% by weight of the total weight of the composition), about 95-97% by weight of the inorganic portion of the ceramic core composition (or about 81-82% by weight of the total weight of the composition), or about 96% by weight of the inorganic portion of the ceramic core composition (or about 81.6% by weight of the total weight of the composition).

Figure 5:
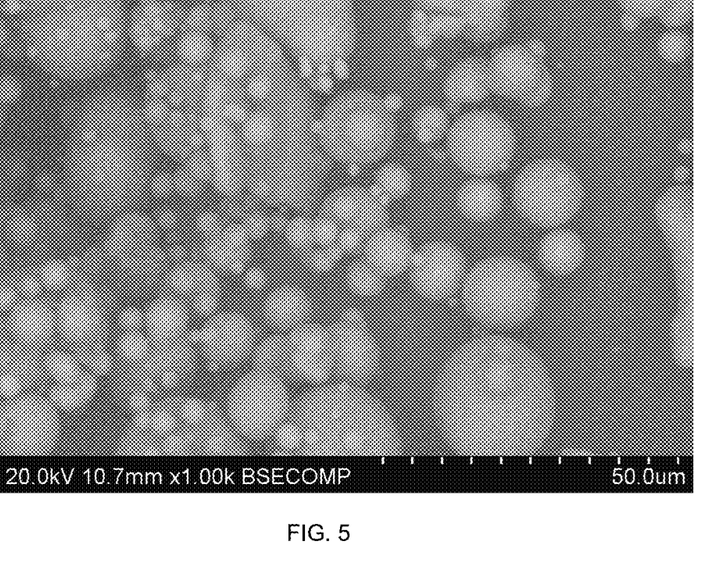
FIG. 5 is a scanning electron micrograph of a silica powder showing a distribution of spherical particles.

FIG. 5 is a scanning electron micrograph showing spherical fused silica particles in accordance with embodiments of the invention. FIG. 5 illustrates that the spherical fused silica particles are provided in a plurality of sizes. According to various embodiments of the invention, the plurality of spherical fused silica particles present in the composition comprises particles ranging in size from about 0.58 microns to about 296 microns. According to some embodiments, the composition has the following particle size distribution, with all percentages reported by volume. About 0 to 3% of the particles are less than 1.16 microns, about 0 to 1.5% of the particles are between 1.16 and 1.64 microns, about 0 to 1.8% of the particles are between 1.64 and 2.31 microns, about 1.4 to 2.4% of the particles are between 2.31 and 3.27 microns, about 1.6 to 2.6% of the particles are between 3.27 and 4.62 microns, about 2.0 to 3.0% of the particles are between 4.62 and 6.54 microns, about 2.9 to 3.9% of the particles are between 6.54 and 9.25 microns, about 4.4 to 5.4% of the particles are between 9.25 and 13.08 microns, about 6.6 to 7.6% of the particles are between 13.08 and 18.50 microns, about 9.2 to 10.2% of the particles are between 18.50 and 26.16 microns, about 12.7 to 13.7% of the particles are between 26.16 and 37.00 microns, about 16.9 to 17.9% of the particles are between 37.00 and 52.33 microns, about 16.7 to 17.7% of the particles are between 52.33 and 74.00 microns, about 9.6 to 10.6% of the particles are between 74.00 and 104.7 microns, about 3.9 to 4.9% of the particles are between 104.7 and 148.0 microns, about 1.4 to 2.4% of the particles are between 148.0 and 209.3 microns, about 1.4 to 2.4% of the particles are between 209.3 and 296.0 microns, and about 0 to 2% of the particles are larger than 296 microns.

In some embodiments, about 0 to 2.8% of the particles are less than 1.16 microns, about 0.3 to 1.2% of the particles are between 1.16 and 1.64 microns, about 0.4 to 1.5% of the particles are between 1.64 and 2.31 microns, about 1.7 to 2.1% of the particles are between 2.31 and 3.27 microns, about 1.9 to 2.3% of the particles are between 3.27 and 4.62 microns, about 2.3 to 2.7% of the particles are between 4.62 and 6.54 microns, about 3.2 to 3.6% of the particles are between 6.54 and 9.25 microns, about 4.7 to 5.1% of the particles are between 9.25 and 13.08 microns, about 6.9 to 7.3% of the particles are between 13.08 and 18.50 microns, about 9.5 to 9.9% of the particles are between 18.50 and 26.16 microns, about 13.0 to 13.4% of the particles are between 26.16 and 37.00 microns, about 17.2 to 17.6% of the particles are between 37.00 and 52.33 microns, about 17.0 to 17.4% of the particles are between 52.33 and 74.00 microns, about 9.9 to 10.3% of the particles are between 74.00 and 104.7 microns, about 4.2 to 4.6% of the particles are between 104.7 and 148.0 microns, about 1.7 to 2.1% of the particles are between 148.0 and 209.3 microns, about 1.7 to 2.1% of the particles are between 209.3 and 296.0 microns, and about 0 to 1.5% of the particles are larger than 296 microns.

In still other embodiments, about 0 to 2.7% of the particles are less than 1.16 microns, about 0.9 to 1.1% of the particles are between 1.16 and 1.64 microns, about 1.2 to 1.4% of the particles are between 1.64 and 2.31 microns, about 1.8 to 2.0% of the particles are between 2.31 and 3.27 microns, about 2.0 to 2.2% of the particles are between 3.27 and 4.62 microns, about 2.4 to 2.6% of the particles are between 4.62 and 6.54 microns, about 3.3 to 3.5% of the particles are between 6.54 and 9.25 microns, about 4.8 to 5.0% of the particles are between 9.25 and 13.08 microns, about 7.0 to 7.2% of the particles are between 13.08 and 18.50 microns, about 9.6 to 9.8% of the particles are between 18.50 and 26.16 microns, about 13.1 to 13.3% of the particles are between 26.16 and 37.00 microns, about 17.3 to 17.5% of the particles are between 37.00 and 52.33 microns, about 17.1 to 17.3% of the particles are between 52.33 and 74.00 microns, about 10.0 to 10.2% of the particles are between 74.00 and 104.7 microns, about 4.3 to 4.5% of the particles are between 104.7 and 148.0 microns, about 1.8 to 2.0% of the particles are between 148.0 and 209.3 microns, about 1.8 to 2.0% of the particles are between 209.3 and 296.0 microns, and about 0 to 1.3% of the particles are larger than 296 microns.

In yet other embodiments, about 0% of the particles are less than 1.16 microns, about 1.0% of the particles are between 1.16 and 1.64 microns, about 1.3% of the particles are between 1.64 and 2.31 microns, about 1.9% of the particles are between 2.31 and 3.27 microns, about 2.1% of the particles are between 3.27 and 4.62 microns, about 2.5% of the particles are between 4.62 and 6.54 microns, about 3.4% of the particles are between 6.54 and 9.25 microns, about 4.9% of the particles are between 9.25 and 13.08 microns, about 7.1% of the particles are between 13.08 and 18.50 microns, about 9.7% of the particles are between 18.50 and 26.16 microns, about 13.2% of the particles are between 26.16 and 37.00 microns, about 17.4% of the particles are between 37.00 and 52.33 microns, about 17.2% of the particles are between 52.33 and 74.00 microns, about 10.1% of the particles are between 74.00 and 104.7 microns, about 4.4% of the particles are between 104.7 and 148.0 microns, about 1.9% of the particles are between 148.0 and 209.3 microns, about 1.9% of the particles are between 209.3 and 296.0 microns, and about 0% of the particles are larger than 296 microns.

According to still yet another embodiment, about 0% of the particles are less than 1.16 microns, about 1% of the particles are between 1.16 and 1.64 microns, about 1% of the particles are between 1.64 and 2.31 microns, about 2% of the particles are between 2.31 and 3.27 microns, about 2% of the particles are between 3.27 and 4.62 microns, about 3% of the particles are between 4.62 and 6.54 microns, about 3% of the particles are between 6.54 and 9.25 microns, about 5% of the particles are between 9.25 and 13.08 microns, about 7% of the particles are between 13.08 and 18.50 microns, about 10% of the particles are between 18.50 and 26.16 microns, about 13% of the particles are between 26.16 and 37.00 microns, about 17% of the particles are between 37.00 and 52.33 microns, about 17% of the particles are between 52.33 and 74.00 microns, about 10% of the particles are between 74.00 and 104.7 microns, about 4% of the particles are between 104.7 and 148.0 microns, about 2% of the particles are between 148.0 and 209.3 microns, about 2% of the particles are between 209.3 and 296.0 microns, and about 0% of the particles are larger than 296 microns.

The spherical fused silica may include combinations of silica in various forms. For example, the spherical fused silica may include an amount of fused silica, alone or together with other forms of silica, such as cristobalite.

The silica is mixed with zircon, in amounts ranging from about 1% to about 10% by weight of the inorganic portion of the ceramic core composition (or about 0.8-8% by weight of the total weight of the SX ceramic core composition). In embodiments, the zircon is combined with the silica in an amount ranging from about 2-6% by weight of the inorganic portion of the ceramic core composition (or about 1.7-5.1% by weight of the total weight of the SX ceramic core composition), or from about 3-5% by weight of the inorganic portion of the ceramic core composition (or about 2.5-4.2% by weight of the total weight of the SX ceramic core composition). In still other embodiments, the zircon is present in the inorganic portion of the ceramic core composition in an amount equal to about 4% by weight of the inorganic portion of the ceramic core composition (or about 3.4% by weight of the total weight of the SX ceramic core composition).

The zircon may include a zircon powder wherein the zircon particles making up the powder are all substantially the same size. In some embodiments, the zircon powder may include a first portion of zircon particles that have a particle size slightly larger than the particle size of a second portion of zircon particles.

Moving on, the binder (or organic portion) comprises about 15% by weight of the total weight of the SX ceramic core composition. The binder includes a binder material, dye, one or more surfactants, and may further include a fiber. Of the organic portion, the binder material comprises about 80-90% by weight (or about 12-13.5% of the total weight of the SX ceramic core composition). In some embodiments, the binder material comprises about 82-89% by weight of the organic portion (or about 12.3-13.3% of the total weight of the SX ceramic core composition), about 84-88% by weight of the organic portion (or about 12.6-13.2% of the total weight of the SX ceramic core composition), about 85-87.5% by weight of the organic portion (or about 12.75-13.1% of the total weight of the SX ceramic core composition), or about 86-87% by weight of the organic portion (or about 12.9-13.05% of the total weight of the SX ceramic core composition). In further embodiments, the binder comprises about 86.6% by weight of the organic portion (or about 13% of the total weight of the SX ceramic core composition). In embodiments, the binder material is a thermoplastic material. The thermoplastic material may be, for example, a paraffin-based wax.

The organic portion of the SX ceramic core composition may further include a dye. The dye may comprise about 1 to 2% by weight of the organic portion (or about 0.15 to 0.3% of the total weight of the SX ceramic core composition). In embodiments, the dye comprises about 1.2 to 1.6% by weight of the organic portion (or about 0.18 to 0.24% of the total weight of the SX ceramic core composition). In still further embodiments, the dye comprises about 1.4% by weight of the organic portion (or about 0.22% of the total weight of the SX ceramic core composition).

In addition to the binder material and the dye, the organic portion of the ceramic core composition may include one or more surfactants. The surfactants may aid with the ability to control the stability of the fired ceramic material at high temperatures. According to embodiments of the invention, the surfactants may include one or more stearates. The stearates may include, but are not limited to sodium stearate and/or aluminum stearate. In some embodiments, the surfactants may include effective amounts of both sodium stearate and aluminum stearate. In further embodiments, the surfactants may additionally, or alternately, include an effective amount of a fatty acid. The fatty acid may be, for example, palmitic acid, stearic acid, lauric acid, myristic acid, capric acid, linoleic acid, oleic acid, myristoleic acid, palmitoleic acid, arachidonic acid, erucic acid, et cetera.

In combination, the surfactants make up about 6 to 12% by weight of the organic portion (or about 0.9-1.8% by weight of the total weight of the SX ceramic core composition). In embodiments, the surfactants may comprise about 7 to 11% by weight of the organic portion (or about 1.1-1.7% by weight of the total weight of the SX ceramic core composition), or about 8 to 10% by weight of the organic portion (or about 1.2-1.5% by weight of the total weight of the SX ceramic core composition). According to further embodiments, the surfactants comprise about 9% by weight of the organic portion (or about 1.35% by weight of the total weight of the SX ceramic core composition).

According to some embodiments, the surfactants comprise sodium stearate, aluminum stearate, and/or oleic acid. In some embodiments, the sodium stearate comprises about 1-5% by weight of the organic portion (or about 0.15-0.75% by weight of the total weight of the SX ceramic core composition). In embodiments, the sodium stearate may comprise about 2 to 4% by weight of the organic portion (or about 0.6-0.6% by weight of the total weight of the SX ceramic core composition. According to further embodiments, the sodium stearate may comprise about 3% by weight of the organic portion (or about 0.45% by weight of the total weight of the SX ceramic core composition).

In embodiments, the aluminum stearate comprises about 0.5 to 4% by weight of the organic portion (or about 0.01-0.6% by weight of the total weight of the SX ceramic core composition), or about 1 to 3% by weight of the organic portion (or about 0.15-0.45% by weight of the total weight of the SX ceramic core composition. According to some embodiments, the aluminum stearate may comprise about 2% by weight of the organic portion (or about 0.3% by weight of the total weight of the SX ceramic core composition).

Embodiments of the invention may include oleic acid in amounts ranging from about 2 to 6% by weight of the organic portion (or about 0.3-0.9% by weight of the total weight of the SX ceramic core composition), or about 3 to 5% by weight of the organic portion (or about 0.45-0.75% by weight of the total weight of the SX ceramic core composition. In embodiments, the oleic acid may comprise about 4% by weight of the organic portion (or about 0.6% by weight of the total weight of the SX ceramic core composition).

The binder may further include an effective amount of a polymeric material for further strengthening the final core product made with the SX ceramic core composition as described herein. In embodiments, the polymeric material may be, for example, polyamide nylon, polyester, Modal, bamboo fiber, rayon fiber, diacetate fiber, and/or triacetate fiber.

Embodiments of the invention may include polymeric material in amounts ranging from about 1 to 5% by weight of the organic portion (or about 0.15-0.75% by weight of the total weight of the SX ceramic core composition), or about 2 to 4% by weight of the organic portion (or about 0.3-0.6% by weight of the total weight of the SX ceramic core composition. In embodiments, the polymeric material may comprise about 3% by weight of the organic portion (or about 0.45% by weight of the total weight of the SX ceramic core composition).

Figure 6:
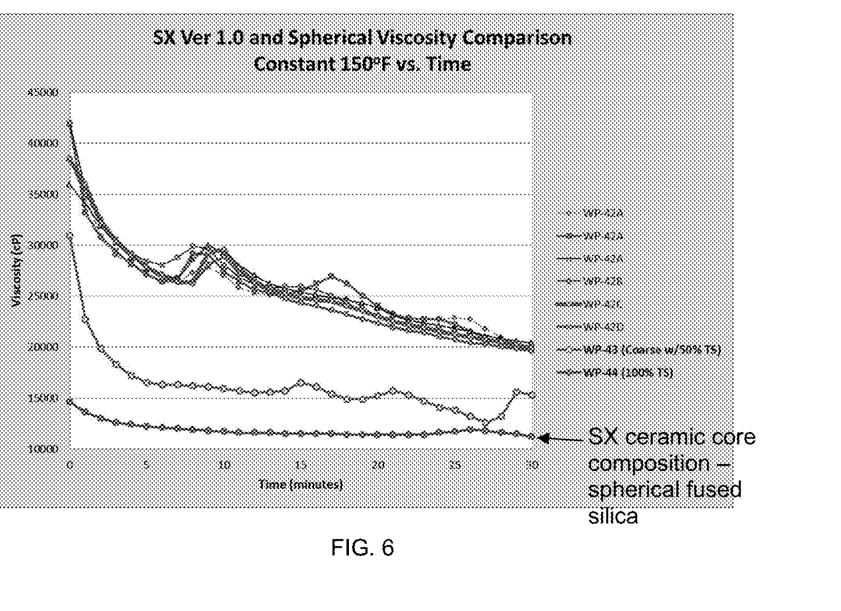
FIG. 6 is a plot showing the viscosity of various silica core compositions as a function of time.

Core components manufactured using the SX ceramic core composition having the spherical fused silica as described herein were tested to determine the strength and flow characteristics of the composition. FIG. 6 shows that, for the SX ceramic core composition with the spherical morphology fused silica, the viscosity remains relatively constant over time, indicating that the composition is relatively stable. To the contrary, previous core compositions (i.e., the upper grouping of lines in FIG. 6) exhibited a significant drop in viscosity over time until the glass shards (in compositions with acicular glass fragments) align with the direction of travel of the fluid. Moreover, FIG. 6 shows that the viscosity of the SX ceramic core composition with the spherical morphology fused silica is significantly lower than the viscosity of other core compositions. The lower viscosity of the SX ceramic core composition with spherical fused silica indicates that flow characteristics are much improved as compared to other core compositions.

Figure 7:
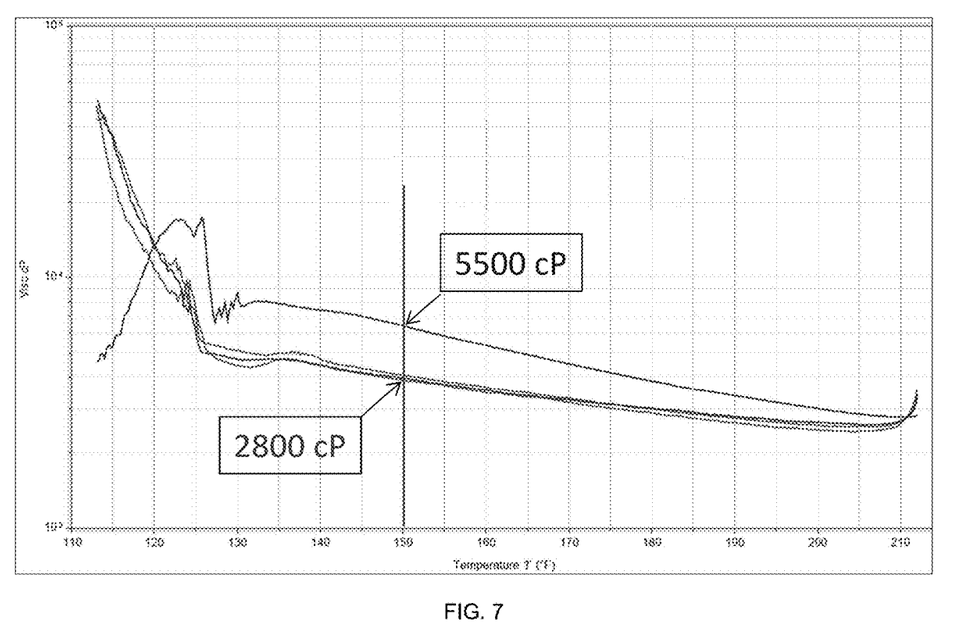
FIG. 7 is another plot showing the viscosity of various silica core compositions as a function of time.

FIG. 7 is another graph showing the viscosity of the spherical fused silica core composition as compared to previous compositions. In FIG. 7, the bottom line represents the viscosity of the SX ceramic core composition with spherical fused silica, while the top line represents conventional core mixes. At an injection temperature of about 150° F., it can be seen that the conventional mix shows a higher viscosity than that of the core mix as described herein. Again, the lower viscosity of the SX ceramic core composition with spherical fused silica indicates that flow characteristics are much improved as compared to other core compositions, especially at the injection temperature.

Due at least in part to the improved flow characteristics of the spherical fused silica core composition, it was found that the composition can be utilized to form ceramic cores that are substantially thinner than possible with previously available core mixes. According to one embodiment, it may be possible to manufacture cores having features with a thickness of about 0.012", which was previously extremely difficult, if not impossible, to accomplish. Importantly, the lower viscosity of the spherical fused silica core composition does not impede the ability to manufacture larger components. For example, cores having a length of greater than 20" and trailing edge features with thicknesses of about 0.040" have been successful injected molded and cast using the spherical fused silica core composition described herein. Accordingly, the inventive core composition can be utilized to form cores in a wide variety of sizes and configurations.

It is well known that ceramic material shrinks by a certain factor when it is heated, known as the shrink factor. The shrink factor is specific to each material composition, and knowing the shrink factor of the material composition, and specifically of ceramic core mixes, is necessary in order to ensure that the final ceramic core is the correct size. When the shrink factor is known, the mold into which the ceramic core mix is injected can be oversized to account for the shrink factor such that, when the ceramic core mix is fired (and necessarily shrinks), the final ceramic core that is removed from the mold is the desired size. Interestingly, the inventive ceramic core mix described herein is unique in that the particle size distribution of the silica in the mix can be modified slightly in order to increase or decrease the shrink factor as necessary. This may be particularly useful where tooling is developed for a composition having a larger (or smaller) shrink factor than is typical for the spherical fused silica SX ceramic core composition described herein.

Many different arrangements of the various components depicted, as well as components not shown, are possible without departing from the spirit and scope of this disclosure. Embodiments of this disclosure have been described with the intent to be illustrative rather than restrictive. Alternative embodiments will become apparent to those skilled in the art that do not depart from its scope. A skilled artisan may develop alternative means of implementing the aforementioned improvements without departing from the scope of this disclosure. It will be understood that certain features and subcombinations are of utility and may be employed without reference to other features and subcombinations, and are contemplated within the scope of this disclosure. Not all steps listed in the various figures need to be carried out in the specific order described. The description should not be restricted to the specific described embodiments.

What is claimed is:

1. A single crystal ceramic core composition, comprising:
   an inorganic portion comprising about 85% by weight of the total weight of the ceramic core composition, the inorganic portion comprising:
     about 94 to 98% by weight spherical fused silica; and
     about 2 to 6% by weight zircon; and
   an organic portion comprising about 15% by weight of the total weight of the ceramic core composition, the organic portion comprising:
     about 84 to 88% by weight binder;
     about 1 to 2% by weight dye;
     about 6 to 12% by weight surfactant; and
     about 1 to 5% by weight polymeric fiber.

2. The ceramic core composition of claim 1, wherein:
   the inorganic portion of the ceramic core composition comprises:
     95 to 97% by weight spherical fused silica; and
     3 to 5% by weight zircon; and
   the organic portion of the ceramic core composition comprises:
     86 to 87% by weight binder;
     1.2 to 1.6% by weight dye;
     8 to 10% by weight surfactant; and
     2 to 4% by weight polymeric fiber.

3. The ceramic core composition of claim 2, wherein the spherical fused silica comprises a plurality of particles, the plurality of particles having the following particle size distribution:

| % of particles | size of particle (in microns) |
|---|---|
| 0-3 | <1.16 |
| 0-1.5 | 1.16-1.64 |
| 0-1.8 | 1.64-2.31 |
| 1.4-2.4 | 2.31-3.27 |
| 1.6-2.6 | 3.27-4.62 |
| 2.0-3.0 | 4.62-6.54 |
| 2.9-3.9 | 6.54-9.25 |
| 4.4-5.4 | 9.25-13.08 |
| 6.6-7.6 | 13.08-18.50 |
| 9.2-10.2 | 18.50-26.16 |
| 12.7-13.7 | 26.16-37.0 |
| 16.9-17.9 | 37.0-52.33 |
| 16.7-17.7 | 52.33-74.0 |
| 9.6-10.6 | 74.0-104.7 |
| 3.9-4.9 | 104.7-148.0 |
| 1.4-2.4 | 148.0-209.3 |
| 1.4-2.4 | 209.3-296.0 |
| 0-2 | >296.0 |

4. The ceramic core composition of claim 1, wherein the spherical fused silica comprises a plurality of particles, the plurality of particles having the following particle size distribution:

| % of particles | size of particle (in microns) |
|---|---|
| 0-3 | <1.16 |
| 0-1.5 | 1.16-1.64 |
| 0-1.8 | 1.64-2.31 |
| 1.4-2.4 | 2.31-3.27 |
| 1.6-2.6 | 3.27-4.62 |
| 2.0-3.0 | 4.62-6.54 |
| 2.9-3.9 | 6.54-9.25 |
| 4.4-5.4 | 9.25-13.08 |
| 6.6-7.6 | 13.08-18.50 |
| 9.2-10.2 | 18.50-26.16 |
| 12.7-13.7 | 26.16-37.0 |
| 16.9-17.9 | 37.0-52.33 |
| 16.7-17.7 | 52.33-74.0 |
| 9.6-10.6 | 74.0-104.7 |
| 3.9-4.9 | 104.7-148.0 |
| 1.4-2.4 | 148.0-209.3 |
| 1.4-2.4 | 209.3-296.0 |
| 0-2 | >296.0 |

5. The ceramic core composition of claim 4, wherein the binder is a thermoplastic material.

6. The ceramic core composition of claim 5, wherein the thermoplastic material is a paraffin-based wax.

7. The ceramic core composition of claim 5, wherein the surfactant comprises sodium stearate, aluminum stearate, and oleic acid.

8. The ceramic core composition of claim 7, wherein the polymeric fiber comprises rayon fiber.

9. The ceramic core composition of claim 1, wherein the spherical fused silica comprises a plurality of particles, the plurality of particles having the following particle size distribution:

| % of particles | size of particle (in microns) |
|---|---|
| 0-2.7 | <1.16 |
| 0.9-1.1 | 1.16-1.64 |
| 1.2-1.4 | 1.64-2.31 |
| 1.8-2.0 | 2.31-3.27 |
| 2.0-2.2 | 3.27-4.62 |
| 2.4-2.6 | 4.62-6.54 |
| 3.3-3.5 | 6.54-9.25 |
| 4.8-5.0 | 9.25-13.08 |
| 7.0-7.2 | 13.08-18.50 |
| 9.6-9.8 | 18.50-26.16 |
| 13.1-13.3 | 26.16-37.0 |
| 17.3-17.5 | 37.0-52.33 |

-continued

| % of particles | size of particle (in microns) |
|---|---|
| 17.1-17.3 | 52.33-74.0 |
| 10.0-10.2 | 74.0-104.7 |
| 4.3-4.5 | 104.7-148.0 |
| 1.8-2.0 | 148.0-209.3 |
| 1.8-2.0 | 209.3-296.0 |
| 0-1.3 | >296.0. |

10. The ceramic core composition of claim 1, wherein the spherical fused silica comprises a plurality of particles, the plurality of particles having the following particle size distribution:

| % of particles | size of particle (in microns) |
|---|---|
| 0 | <1.16 |
| 1 | 1.16-1.64 |
| 1 | 1.64-2.31 |
| 2 | 2.31-3.27 |
| 2 | 3.27-4.62 |
| 3 | 4.62-6.54 |
| 3 | 6.54-9.25 |
| 5 | 9.25-13.08 |
| 7 | 13.08-18.50 |
| 10 | 18.50-26.16 |
| 13 | 26.16-37.0 |
| 17 | 37.0-52.33 |
| 17 | 52.33-74.0 |
| 10 | 74.0-104.7 |
| 4 | 104.7-148.0 |
| 2 | 148.0-209.3 |
| 2 | 209.3-296.0 |
| 0 | >296.0. |

11. A single crystal ceramic core composition, comprising:
an inorganic portion comprising about 85% by weight of the total weight of the ceramic core composition, the inorganic portion comprising:
about 94 to 98% by weight spherical fused silica; and
about 2 to 6% by weight zircon; and
an organic portion comprising about 15% by weight of the total weight of the ceramic core composition, the organic portion comprising:
about 84 to 88% by weight binder; and
about 12 to 16% by weight surfactant and dye.

12. The ceramic core composition of claim 11, wherein the surfactant comprises 6 to 12% by weight of the organic portion.

13. The ceramic core composition of claim 12, wherein the binder is a paraffin-based wax.

14. The ceramic core composition of claim 11, wherein the spherical fused silica comprises 96% by weight of the inorganic portion, and wherein the balance of the weight of the inorganic portion is zircon.

15. The ceramic core composition of claim 14, wherein the binder comprises 86.5% by weight of the organic portion, and wherein the balance of the weight of the organic portion is surfactant and dye.

16. The ceramic core composition of claim 11, wherein the surfactant comprises sodium stearate, aluminum stearate, and a fatty acid.

17. The ceramic core composition of claim 11, wherein the spherical fused silica comprises a plurality of particles, the plurality of particles having the following particle size distribution:

| % of particles | size of particle (in microns) |
|---|---|
| 0-3 | <1.16 |
| 0-1.5 | 1.16-1.64 |
| 0-1.8 | 1.64-2.31 |
| 1.4-2.4 | 2.31-3.27 |
| 1.6-2.6 | 3.27-4.62 |
| 2.0-3.0 | 4.62-6.54 |
| 2.9-3.9 | 6.54-9.25 |
| 4.4-5.4 | 9.25-13.08 |
| 6.6-7.6 | 13.08-18.50 |
| 9.2-10.2 | 18.50-26.16 |
| 12.7-13.7 | 26.16-37.0 |
| 16.9-17.9 | 37.0-52.33 |
| 16.7-17.7 | 52.33-74.0 |
| 9.6-10.6 | 74.0-104.7 |
| 3.9-4.9 | 104.7-148.0 |
| 1.4-2.4 | 148.0-209.3 |
| 1.4-2.4 | 209.3-296.0 |
| 0-2 | >296.0. |

* * * * *